United States Patent
Kurd

(10) Patent No.: US 7,730,118 B2
(45) Date of Patent: Jun. 1, 2010

(54) MULTIPLY-ACCUMULATE UNIT AND METHOD OF OPERATION

(75) Inventor: Tariq Kurd, Bristol (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 1072 days.

(21) Appl. No.: 11/400,020

(22) Filed: Apr. 7, 2006

(65) Prior Publication Data

US 2006/0277245 A1 Dec. 7, 2006

(30) Foreign Application Priority Data

Apr. 7, 2005 (EP) .................................. 05252194

(51) Int. Cl.
*G06F 7/38* (2006.01)
(52) U.S. Cl. ..................................................... 708/523
(58) Field of Classification Search ................. None
See application file for complete search history.

(56) References Cited

U.S. PATENT DOCUMENTS

| | | | |
|---|---|---|---|
| 4,852,037 A * | 7/1989 | Aoki | 708/523 |
| 5,436,860 A | 7/1995 | Shankar et al. | |
| 5,847,981 A | 12/1998 | Kelley et al. | |
| 6,611,856 B1 * | 8/2003 | Liao et al. | 708/523 |
| 7,107,305 B2 * | 9/2006 | Deng et al. | 708/523 |
| 2003/0172101 A1 | 9/2003 | Liao et al. | |

OTHER PUBLICATIONS

Liao, Y, et al.: "A High-Performance and Low-Power 32-Bit Multiply-Accumulate Unit with Single-Instruction-Multiple-Data (SIMD) Feature", IEEE Journal of Solid-State Circuits, IEEE Inc., New York, US, vol. 37, No. 7, Jul. 2002, pp. 926-931, XP001221317.

* cited by examiner

*Primary Examiner*—David H Malzahn

(57) ABSTRACT

An arithmetic unit for selectively implementing one of a multiply and multiply-accumulate instruction, including a multiplier, addition circuitry, a result register, and accumulator circuitry. The multiplier arranged to receive first and second operands and operable to generate multiplication terms. The addition circuitry for receiving multiplication terms from the multiplier and operable to combine them to generate a multiplication result. The result register for receiving the multiplication result from the adder. The accumulator circuitry connected to receive a value stored in the result register and an accumulate control signal which determines whether the arithmetic unit implements a multiply or a multiply-accumulate instruction.

22 Claims, 6 Drawing Sheets

PRIOR ART

MULTIPLY-ACCUMULATE UNIT AND METHOD OF OPERATION

TECHNICAL FIELD OF THE INVENTION

The present invention relates to a multiply-accumulate unit for selectively implementing multiply and multiply-accumulate operations.

BACKGROUND OF THE INVENTION

Multiply-accumulate (MAC) operations are required in processor cores. Multiply-accumulate is an important and expensive operation. It is frequently used in digital signal processing and video/graphics applications. As a result, any improvement in the delay for performing this operation has a significant impact on various aspects of processor performance.

FIG. 1 is a schematic diagram illustrating a method of implementing a multiply-accumulate (MAC) instruction with three source operands. Each 32 bit source operand, Operand 1, Operand 2 and Operand 3, is held in a respective register, Reg 1, Reg 2, Reg 3. The first and second operands are supplied to a 32×32 bit multiplier 2, the outputs of which (in the form of 64 pairs of sum/carry terms) are supplied to a set of full adders in block 4 for the purposes of accumulation. The third operand, Operand 3, is also supplied to the full adder block 4. The full adder block adds in the third operand the multiplication result. The outputs from the full adder block 4 are supplied to an add 64 block 6 which combines the terms from the full adder block and generates a final result. The final result is placed in a result register Reg R. According to this schematic, two of the three operands are multiplied together, and the third operand is added to the result of the multiplication. All three source operands are held in registers (generally implemented as flip-flops), and the final result is stored in a register (flip-flops). Three operands are required, they are all read from a register file at once, and the result is written back to the register file. This enlarges the register file and makes the wiring worse.

The cost of providing the third register Reg 3 for the third operand, with the corresponding flip-flop and wiring renders a unit such as that illustrated in FIG. 1 for implementing a MAC instruction unduly expensive. Moreover, when used for a multiply (MUL) operation, the third register is redundant.

FIG. 2 illustrates a multiply unit which is readily available in many processor cores. The multiply unit comprises first and second registers for holding respective operands, a 32×32 multiplier block 2, an add 64 block 6 and a result register Reg R. Like numerals denote like parts as in FIG. 1. Operation of such a multiply unit is known in the art.

There exists units which can implement MUL and MAC instructions, for example as described in the following.

United States Publication No. US2003/0172101 describes a multiply-accumulate unit (MAC) for use in a processor based system. The MAC includes control logic that allows it to implement multiply or multiply-accumulate instructions.

XP 001221317 ("A High Performance and Low-Power 32-bit Multiply-Accumulate Unit With Single-Instruction-Multiple-Data (SIMD) Feature") describes a multiply-accumulate unit (MAC) that is capable of implementing multiply and multiply-accumulate instructions.

U.S. Pat. No. 5,436,860 describes a multiply-accumulate unit that wherein the multiply-accumulate circuitry is reused to provide barrel shifter functionality.

SUMMARY OF THE INVENTION

To address the above-discussed deficiencies of the prior art, it is an aim of the invention to provide a MUL-MAC unit with lower power and lower chip overhead than has been available until now.

According to an aspect of the present invention there is provided an arithmetic unit for selectively implementing one of a multiply and multiply-accumulate instruction, comprising: a multiplier arranged to receive first and second operands and operable to generate multiplication terms; addition circuitry for receiving multiplication terms from the multiplier and operable to combine them to generate a multiplication result; an output register for receiving the multiplication result from the adder; and accumulator circuitry connected to receive a value stored in the result register and an accumulate control signal which determines whether the arithmetic unit implements a multiply or a multiply-accumulate instruction; said result register being arranged to hold the result of a multiply instruction for retrieval when a multiply instruction is implemented and to be overwritten with an accumulator result when a multiply-accumulate instruction is implemented.

A further aspect of the invention provides a processor including such an arithmetic unit and an execution unit arranged to execute a first instruction to retrieve an accumulator result from the result register and a second instruction to load an accumulator value into the arithmetic unit.

Another aspect of the invention provides a method of operating an arithmetic unit for selectively implementing one of a multiply and multiply-accumulate instruction, the method comprising: supplying first and second operands to a multiplier operable to generate multiplication terms; supplying the multiplication terms to addition circuitry operable to generate a multiplication result; storing the multiplication result in a result register of the arithmetic unit; supplying a value stored in the result register to accumulator circuitry; and selectively operating an accumulate control signal supplied to the accumulator circuitry to determine whether the arithmetic unit implements a multiply or a multiply-accumulate instruction; wherein when a multiply instruction is implemented the result of a multiply instruction is retrieved from the result register and when a multiply-accumulate instruction is implemented, the value in the result register is overwritten with an accumulator result.

A further aspect of the invention provides a method of implementing a multiply instruction in a processor, the method comprising: executing a first instruction to retrieve an accumulator result from a result register of an arithmetic unit in the processor; executing a multiply instruction which causes first and second operands to be supplied to the arithmetic unit which is operable to generate a multiplication result; transferring the multiplication result from the result register to a destination register of the processor; and executing a further instruction to load an accumulator value into the arithmetic unit in readiness for a subsequent multiply-accumulate instruction.

The advantage of the inventive claim is the use of a single register for holding results, and also as an accumulator for a MAC instruction.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "processor" may mean any device, system or part thereof that controls at least one operation, such a device may be implemented in hardware, firmware or software, or some combination of at least two of the same. It should be noted that the functionality associated with any particular apparatus or controller may be centralized or distributed, whether locally or remotely. Definitions for certain words and phrases are provided throughout this patent document, those of ordinary skill in the art should understand that in many, if not most instances, such definitions apply to prior, as well as future uses of such definitions words and phrases.

BRIEF DESCRIPTION OF THE DRAWINGS

For a better understanding of the present invention and to show how the same may be carried into effect, reference will now be made by way of example to the accompanying drawings, in which like reference numerals represent like parts, and in which.

DETAILED DESCRIPTION OF THE INVENTION

FIGS. 3 through 10, discussed below, and the various embodiments used to describe the principles of the present invention in this patent document are by way of illustration only and should not be construed in any way to limit the scope of the invention. Those skilled in the art will understand that the principles of the present invention may be implemented in any processing system having a suitably arranged multiply-accumulate unit.

Figure 2:
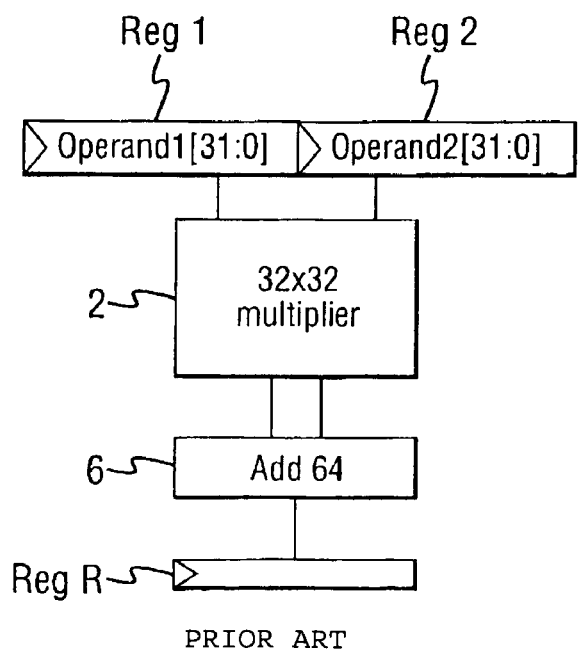
FIG. 2 is a schematic block diagram of a unit for implementing a MUL instruction.
Figure 3:
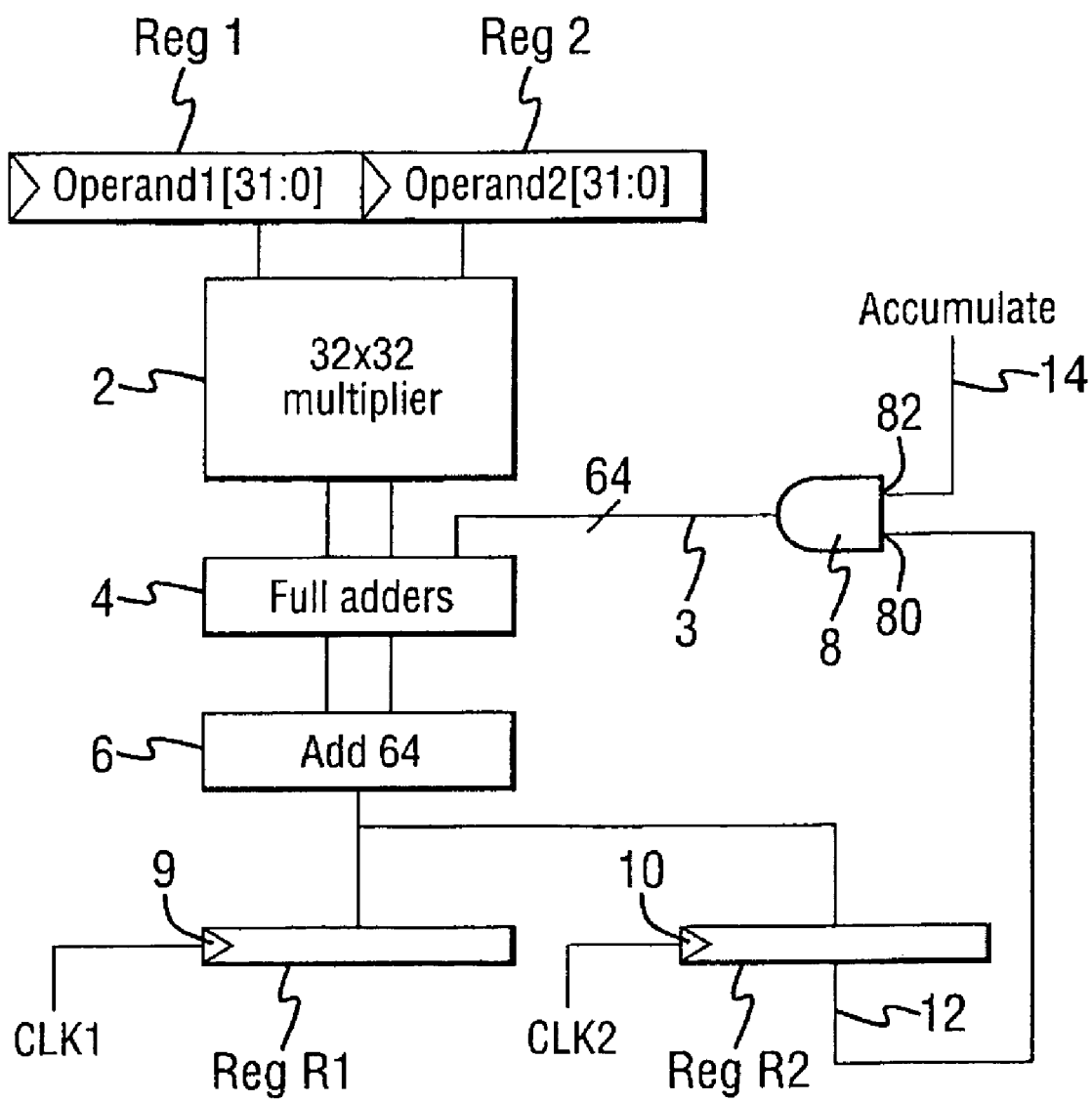
FIG. 3 is a schematic block diagram of a MUL/MAC unit.

FIG. 3 illustrates a multiply-accumulate unit 1 which is described herein by way of background explanation for the embodiments that follow. Like numerals denote like parts as in FIGS. 1 and 2.

In the multiply-accumulate unit of FIG. 3, first and second 32 bit operands, Operand 1, Operand 2, are loaded into respective first and second registers Reg 1, Reg 2 by execution of a MAC or MUL instruction. The outputs of these registers are connected to a 32×32 multiplier block 2 which supplies its outputs (in the form of 64 pairs of sum/carry terms) to a full adder block 4. In this case, the full adder block receives an additional 64 bit input 3 from a set of logic gates, herein labelled as 8, which allow an accumulator function to be implemented as described in the following. They are referred to herein as accumulator gates. The outputs from the full adder block 4 are supplied to an add 64 block 6. In this case, there are two result registers, Reg R1 and Reg R2. The register R1 has a clock input 9 for receiving a first clock signal CLK1. The result register Reg R2 has a clock input 10 for receiving a second clock signal CLK2, and an output 12 which supplies one input 80 of the accumulator gates. The other input of the accumulator gates 8 receives an accumulate signal 82, which is active when a MAC instruction is executed and inactive when a MUL instruction is executed.

Figure 4:
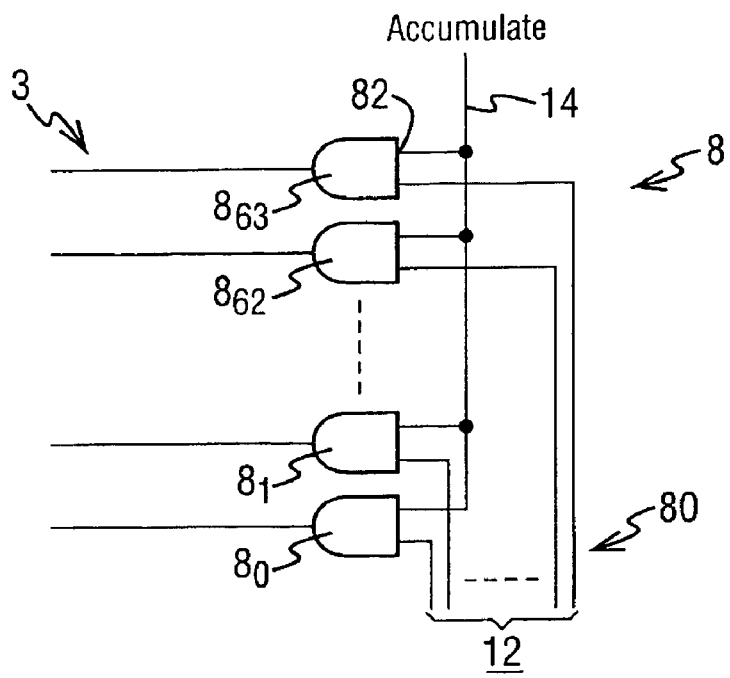
FIG. 4 is a schematic block diagram of accumulating gates.

The accumulator gates 8 are shown in more detail in FIG. 4. A plurality of AND gates (64 in this case) $8_0 \ldots 8_{63}$, each receive one bit of the result 12 to be accumulated at one input and the accumulate signal 14 at the other input. The 64 bit output 16 from the accumulator gates is supplied to the full adder block, which thus acts to accumulate the multiplication results.

The provision of a local accumulator function has the effect that the result of previous multiply or multiply-accumulate instructions can be added into future multiply-accumulate instructions, providing the required accumulation. If a MUL operation is to be implemented, the clock CLK1 at input 9 is active. If a MAC operation is to be implemented, the clocks CLK1 and CLK2 are both active and the accumulate signal 14 is set to one. This has the effect that the output of the second result register Reg R2 is supplied to the accumulator 8. If a MAC operation is not needed, the clock CLK2 at input 10 is inactive, and the accumulate signal 14 is set to zero. The unit then operates as a normal MUL unit.

The second result register Reg R2 can be implemented by a bank of flip-flops and holds the accumulation result. The accumulation result is selectively fed back into the next operation depending upon whether it is a normal multiplication or a multiply-accumulate instruction. This allows the hardware to be shared between multiply and multiply-accumulate instructions. It will be appreciated that when the MUL/MAC unit is read, it is the result stored in the first result register REG 1 which is read out.

Figure 1:
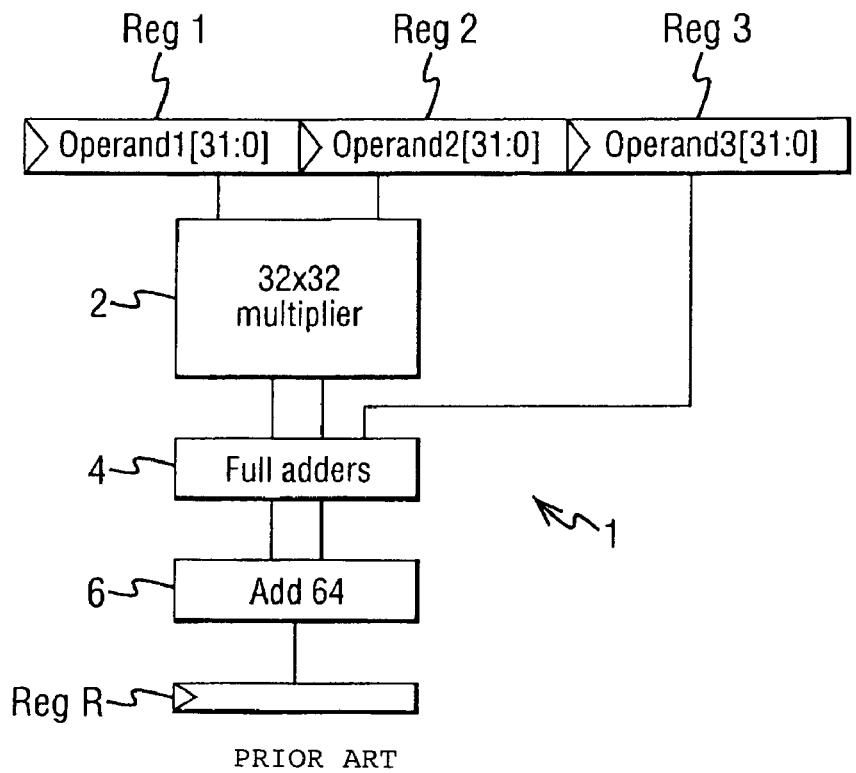
FIG. 1 is a schematic block diagram of a unit for implementing a MAC instruction.

This design represents an improvement over the design of FIG. 1, because it removes the third register for holding a third source operand. However, it still requires an additional 64 flip-flops to implement the second result register Reg R2, and it also requires a row of full adders in the full adder block 4 to perform the accumulation, which is in addition to a normal multiplier design.

Figure 5:
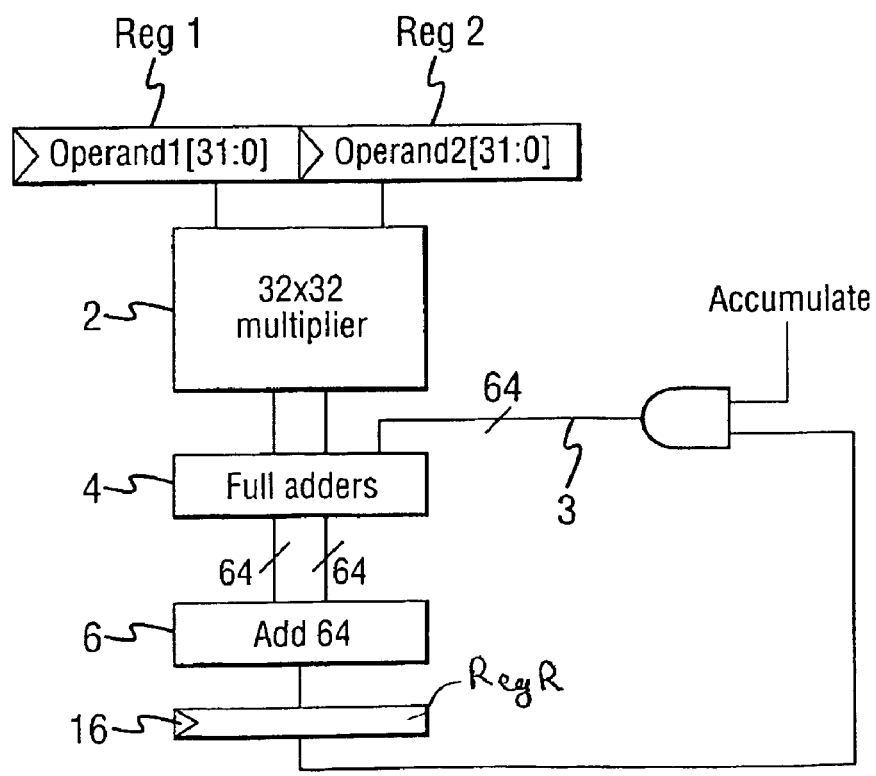
FIG. 5 is a schematic block diagram of a MUL/MAC unit in accordance with an embodiment of the invention.

FIG. 5 represents an embodiment of the invention in which the design has been further improved. In the embodiment of FIG. 5, the second result register Reg R2 has been removed, thus saving area. Moreover, because 64 less flip-flops are being clocked for a MAC operation, power is saved. A clock signal CLK is supplied to the existing result register Reg R at input 16 for clocking the result register in the event of an active instruction, MUL or MAC. The output of the result register Reg R is supplied to the input of the accumulator gates 8. The accumulator gates are as illustrated in FIG. 4.

The removal of the second result register in the embodiment of FIG. 5 means that software executed on a CPU to implement multiplication and multiply-accumulate operations needs to be slightly modified to take this into account. It will readily be appreciated that when the clock signal 16 is active, with the accumulate signal 14 set to zero, the multiplication result will remain "refreshed" in the result register Reg R. However, when the accumulate signal is set, at the first active clock pulse the previous multiplication result will be overwritten with the accumulated result. Thus this accumulated result needs to be read out at the end of the MAC operation by executing an instruction as follows:

MAC r0, r0, rx where r0 is a register of the CPU holding a value of zero and rx is a destination register. This has the effect of loading zeros into the first and second operand registers Reg 1, Reg 2 which means that the stored value is written out of the multiply-accumulate unit into the destination register rx of the CPU.

Conversely, an accumulator value can be set in the result register Reg R prior to a MAC operation by executing the instruction:

MUL<accumulator value to set>, 1, which has the effect of loading the accumulator value to be set in the first operand register and the value of one in the second operand register. Therefore the multiplication operation which is implemented by the multiply-accumulate unit results in the accumulator value to be set being loaded into the result register REG R.

Using these two instructions means that the multiply-accumulate unit can switch between operating as a multiplier and a multiply-accumulate unit. When the multiply-accumulate unit result needs to be removed so that the unit can operate as a multiplier, the first of the above-referenced instructions is implemented. When the unit ceases to be used as a multiplier and needs to be used again as a multiply-accumulate unit, the initial accumulator value can be set using the second of the above-referenced instructions.

The design of FIG. 5 is cheaper still to implement than the design of FIG. 3, because it avoids the need for the second result register.

Figure 6:
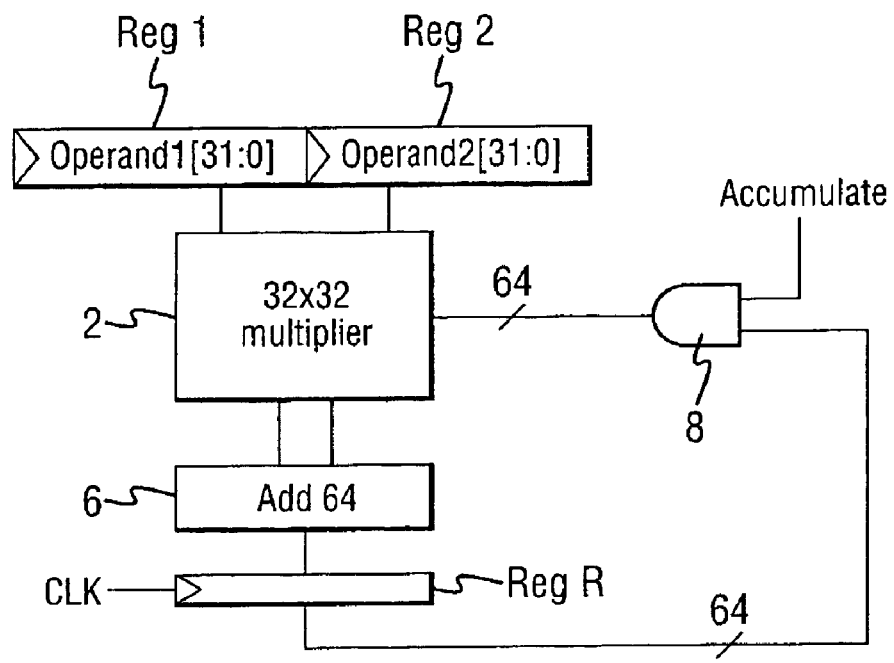
FIG. 6 is a schematic block diagram of a MUL/MAC unit in accordance with another embodiment of the invention.

A still further improvement can be made which will now be described with reference to FIGS. 6 to 8. As shown in FIG. 6, it is possible for some multiplier configurations to be implemented without the full adder block leading to the construction of the multiply-accumulate unit shown in FIG. 6 where the outputs of the multiplier are fed directly to the add 64 block, and the output of the accumulator is fed directly into the multiplier block 2.

Figure 7:
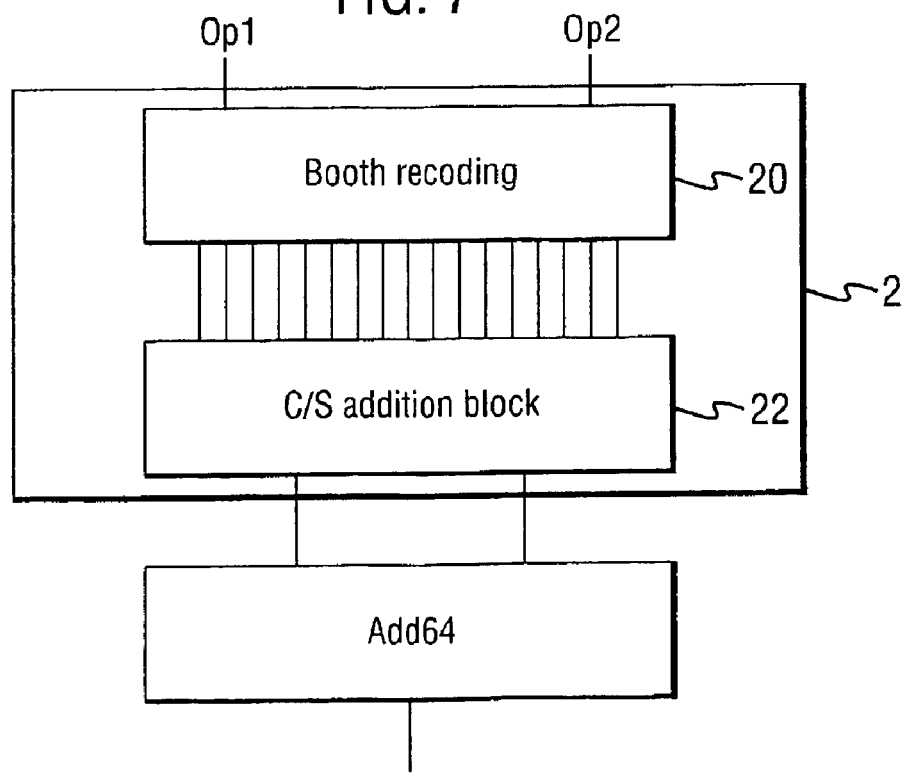
FIG. 7 is a schematic block diagram of a multiplier.
Figure 8:
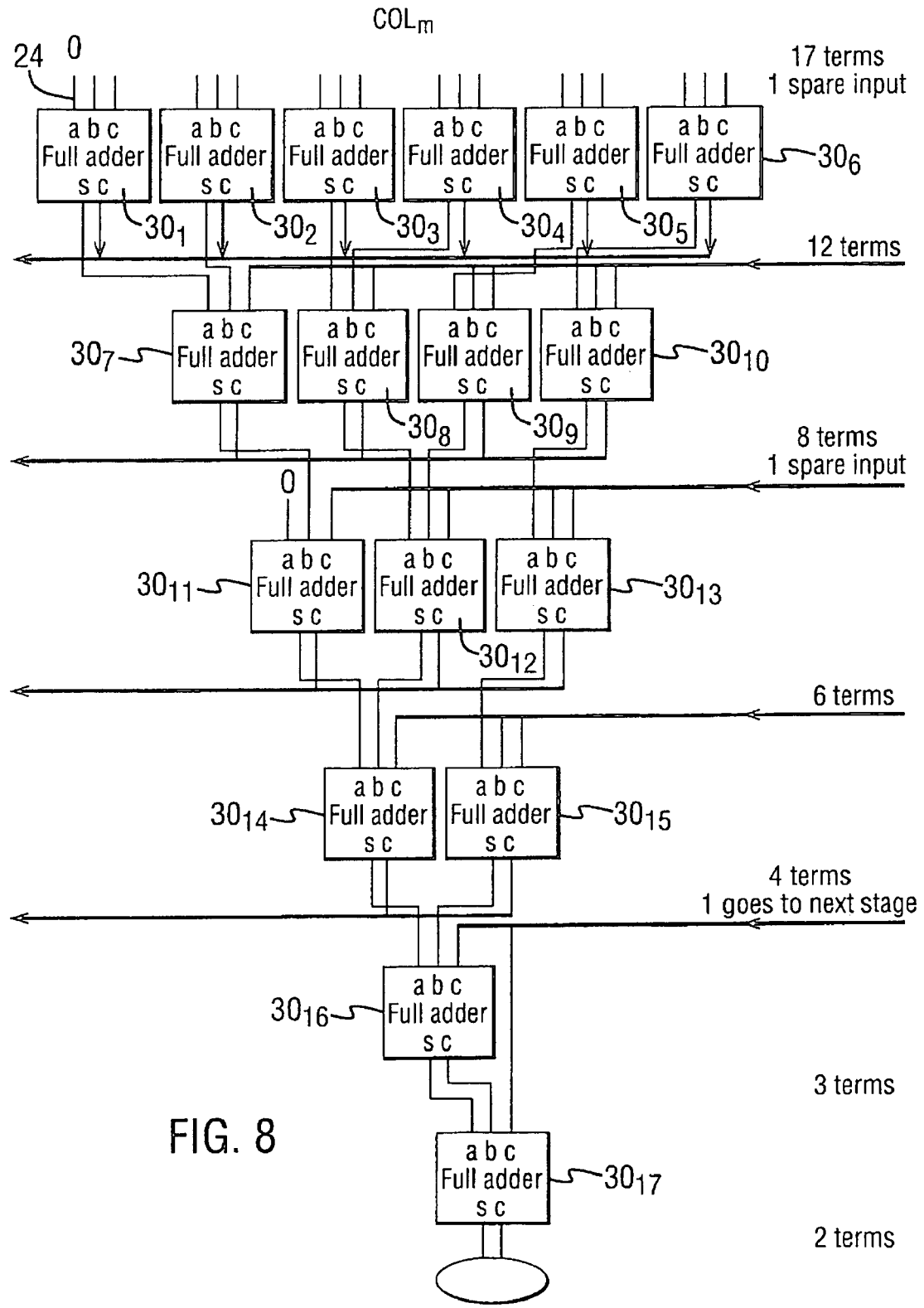
FIG. 8 is a schematic block diagram of one column of a Wallace tree.

One example of a multiplier configuration which will allow this optimisation is illustrated in FIG. 7. This multiplier block 2 includes a booth recoding block 20 which receives the two operands Op 1, Op 2 and which provides an output of seventeen terms. The seventeen terms are fed to a carry-save addition block 22 which implements carry-save addition of the seventeen terms down to two terms. That is, for each bit position of the result (63 to 0) a maximum of 17 bits needs to be added. A Wallace tree construction for adding 17 terms is well known in the art. It comprises 64 columns of varying heights, the heights being determined by the number of levels in a column. FIG. 8 illustrates one column $COL_m$ of a Wallace tree which will add 17 terms. The first level of the Wallace tree comprises six 3 bit adders $30_1 \ldots 30_6$ each having three inputs labelled a, b, c, a sum output s and a carry output c. As there are seventeen terms, the first input of the first full adder $30_1$ (labelled 24) is spare. The first level of the Wallace tree provides its carry outputs to the adjacent column of the Wallace tree (not shown), while its sum outputs are supplied to respective adders $30_7 \ldots 30_{10}$ in the second level of this column of the Wallace tree. That is, the sum outputs from the first two adders $30_1, 30_2$ in the first level are supplied to the first adder $30_7$ in the second level, the sum outputs from the second two adders $30_3, 30_4$ in the first level are supplied to the second adder $30_8$ in the second level, the sum output from the fifth adder $30_5$ in the first level is supplied to the third adder $30_9$ in the second level and the sum output from the sixth adder $30_6$ in the first level is supplied to the fourth adder $30_{10}$ in the second level. In addition, the adders in the second level receive carry inputs from the adjacent column of the Wallace tree on the other side (not shown). The four 3 bit adders of the second level $30_7 \ldots 30_{10}$ receive a total of twelve terms. The third level of the Wallace tree comprises three 3 bit adders $30_{11} \ldots 30_{13}$, which are set to receive eight terms, being four sum terms from the preceding level of the Wallace tree and four carry terms from the adjacent column. This means that there is another spare input, labelled 26, in the third level of the Wallace tree.

The fourth level of the Wallace tree comprises two 3 bit adders $30_{14}, 30_{15}$ which receive six terms, being two sum terms from the preceding level of the Wallace tree and three carry terms from the adjacent column. The fourth level of the Wallace tree outputs two carry terms to the next column and two sum terms to the next level of the Wallace tree which comprises a 3 bit adder $30_{16}$. Two carry terms are received from the adjacent column, one of which is supplied to the 3 bit adder constituting the fifth level of the Wallace tree, and the other of which is supplied to a final stage adder $30_{17}$.

Figure 9:
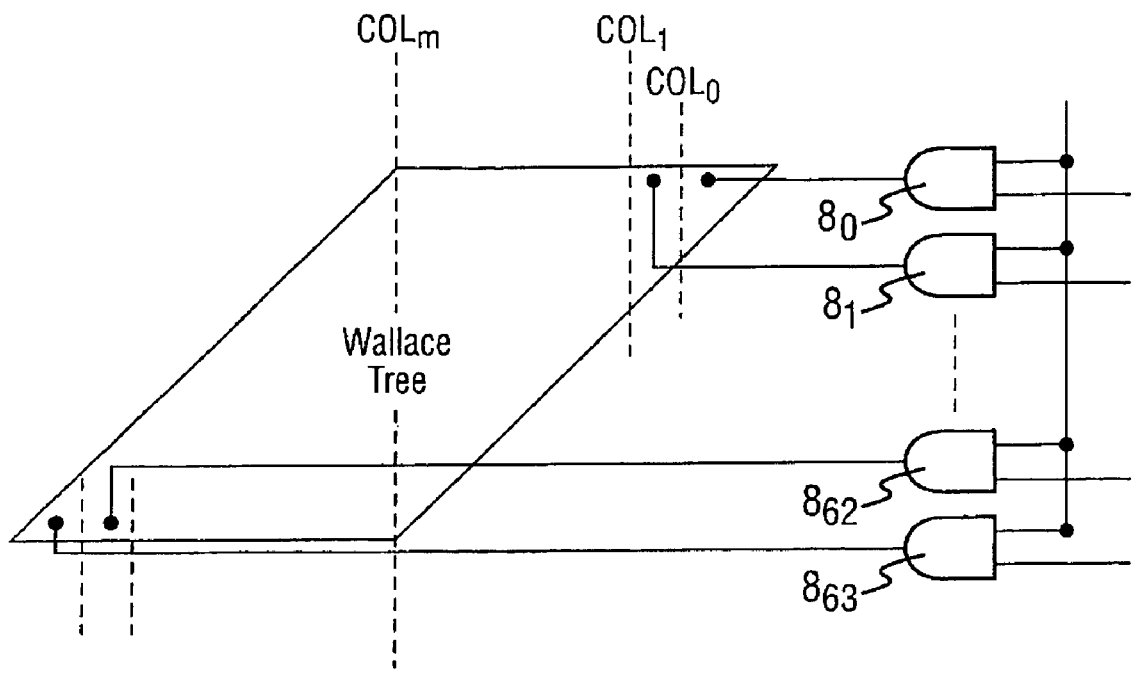
FIG. 9 shows a schematic diagram of the Wallace tree of FIG. 8.

It can be seen from the above that each column of the Wallace tree has two spare inputs, one, 24, in the first level and one, 26, in the third level. Each output from the accumulator 8 can be applied to one of these spare inputs. Either the spare inputs in the first level or the spare inputs in the third level can be used, though it would seem advantageous to use the spare inputs in the third level. It will be appreciated that the signal of same bit weight from the accumulator is applied to the column of the Wallace tree having the same bit weight. FIG. 9 shows this schematically.

By introducing the value to the accumulator directly into the Wallace tree construction, no full adders are needed to achieve the multiply-accumulate operation.

The first and second instructions for removing the accumulated value and resetting the accumulated value as described above in relation to the embodiment of FIG. 5 are also applicable to the embodiment of FIG. 6.

The above-described embodiments of FIGS. 5 and 6 provide an arithmetic unit which can perform a multiply or multiply-accumulate operate using a shared result register, therefore not adding any extra state (for example flip-flops). Moreover, all of the above-described embodiments provide an arithmetic unit in which a multiply-accumulate operation can be carried out with the same logical delay as a multiply operation.

Figure 10:
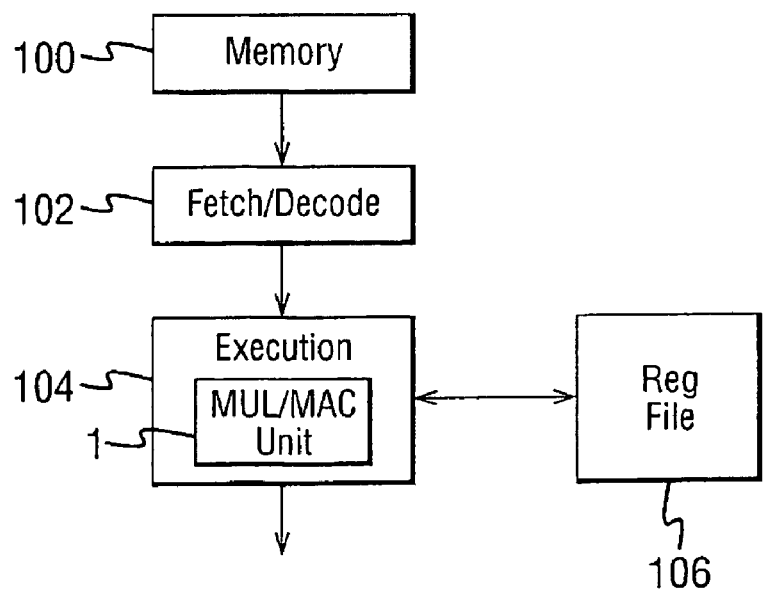
FIG. 10 is a schematic diagram of an exemplary processor using a multiply-accumulate unit according to the principles of the present invention.

FIG. 10 is a schematic diagram of a processor which uses a multiply-accumulate unit 1 as hereinabove described. The processor comprises an instruction memory 100 for holding instructions including multiply instructions, multiply-accumulate instructions and special instructions of the type described above. A fetch decode block 102 fetches instructions from the instruction memory 100 and supplies them to an execution stage 104 for execution. The execution stage includes or is associated with the multiply-accumulate unit 1 and cooperates with a register file 106 which includes source and destination registers for cooperation with the multiply-accumulate unit 1 as hereinabove described. It is intended that the present invention encompass such changes and modifications as fall within the scope of the appended claims.

What is claimed is:

1. An arithmetic unit comprising:
a multiply-accumulate circuit having first and second operand inputs and an accumulator input;

an first addition circuit to receive multiply-accumulate terms from the multiply-accumulate circuit and to generate a multiply-accumulate result;

a result register to receive the multiply-accumulate result from the first addition circuit; and an accumulator circuit to receive an accumulate signal and a current contents the result register, wherein the accumulator circuit is coupled to the accumulator input of the multiply-accumulate circuit and the accumulator input receives the current multiply-accumulate result from the result register when the accumulate signal is asserted and does not receive the current multiply-accumulate result of the result register when the accumulate signal is not asserted.

2. The arithmetic unit of claim 1, wherein the multiply-accumulate circuit comprises:

a multiply circuit to receive the first and second operand inputs; and a second addition circuit to receive the accumulator input and multiplication terms from the multiply circuit and to generate the multiply-accumulate terms.

3. The arithmetic unit of claim 2, wherein:

the first and second operand inputs comprise first and second numbers of bits, respectively;

the multiply circuit generates a number of multiplication terms equal to a sum of the first and second numbers of bits; and the second addition circuit comprises a number of full adders equal to the number of multiplication terms.

4. The arithmetic unit of claim 2, wherein the multiply circuit comprises a Booth recoding circuit.

5. The arithmetic unit of claim 4, wherein the second addition circuit comprises a Wallace tree circuit.

6. The arithmetic unit of claim 1, wherein the result register comprises first and second registers to receive the multiply-accumulate result from the first addition circuit.

7. The arithmetic unit of claim 1, wherein the accumulator circuit comprises an AND gate.

8. A processor comprising:

an instruction memory;

a fetch-decode block to fetch instructions from the instruction memory; and an execution stage to execute multiply and multiply-accumulate instructions received from the fetch-decode block, wherein the execution stage includes an arithmetic unit comprising:

a multiply-accumulate circuit having first and second operand inputs and an accumulator input;

a first addition circuit to receive multiply-accumulate terms from the multiplier circuit and to generate a multiply-accumulate result;

a result register to receive the multiply-accumulate result from the first addition circuit; and an accumulator circuit to receive an accumulate signal and the multiply-accumulate result from the result register, wherein the accumulator circuit is coupled to the accumulator input and the accumulator input of the multiply-accumulate circuit receives the multiply-accumulate result from the result register when the accumulate signal is asserted.

9. The processor of claim 8, wherein the multiply-accumulate circuit comprises:

a multiply circuit to receive the first and second operand inputs; and a second addition circuit to receive the accumulator input and multiplication terms from the multiply circuit and to generate the multiply-accumulate terms.

10. The processor of claim 9, wherein:

the first and second operand inputs comprise first and second numbers of bits, respectively;

the multiply circuit generates a number of multiplication terms equal to a sum of the first and second numbers of bits; and the second addition circuit comprises a number of full adders equal to the number of multiplication terms.

11. The processor of claim 9, wherein the multiply circuit comprises a Booth recoding circuit.

12. The processor of claim 11, wherein the second addition circuit comprises a Wallace tree circuit.

13. The processor of claim 8, wherein the result register comprises first and second registers to receive the multiply-accumulate result from the first addition circuit.

14. The processor of claim 8, wherein the accumulator circuit comprises an AND gate.

15. The processor of claim 8, wherein the execution stage is configured to execute a first instruction to retrieve a multiply-accumulate result from the result register and a second instruction to load an accumulator value into the arithmetic unit.

16. A method of operating an arithmetic unit having first and second operand inputs, an accumulate signal input and a result register, and method comprising:

providing an accumulator input, wherein the accumulator input is equal to a current multiply-accumulate result of the result register when the accumulate signal input is asserted and does not equal the current multiply-accumulate result of the result register when the accumulator signal input is not asserted;

performing a multiply-accumulate operation on the first and second operand inputs and the accumulator input to generate multiply-accumulate terms;

adding the multiply-accumulate terms to generate a multiply-accumulate result; and loading the multiply-accumulate result into the result register.

17. The method of claim 16, wherein an accumulated result is read out by:

inputting zero values to the first and second operand inputs;

asserting the accumulate signal input; and storing the current multiply-accumulate result of the result register as the accumulated result after performing the steps of performing a multiply-accumulate operation, adding the multiply-accumulate terms, and loading the multiply-accumulate result into the result register.

18. The method of claim 16, wherein a specified accumulator value is preset by:

inputting the specified accumulator value to the first operand input and a value of one to the second operand input;

setting the accumulate signal input to an unasserted value; and performing the steps of performing a multiply-accumulate operation, adding the multiply-accumulate terms, and loading the multiply-accumulate result into the result register.

19. The method of claim 16, wherein the first and second operand inputs comprise first and second numbers of bits, respectively, and performing a multiply-accumulate operation further comprises:

multiplying the first and second operands to generate a number of multiplication terms equal to a sum of the first and second numbers of bits; and adding the multiplication terms and the accumulator input with a number of full adders equal to the number of multiplication terms to generate the multiply-accumulate result.

20. The method of claim 16, wherein performing a multiply-accumulate operation further comprises:
   multiplying the first and second operands with a Booth recoding circuit; and
   adding the multiplication terms and the accumulator input with a Wallace tree circuit to generate the multiply-accumulate result.

21. The method of claim 16, wherein the result register comprises first and second result registers and wherein:
   the accumulator input is equal to a current multiply-accumulate result of the second result register when the accumulate signal input is asserted;
   the first result register is loaded in response to a first clock signal; and
   the second result register is loaded in response to a second clock signal,
   wherein the second clock signal is active only when the arithmetic unit is performing a multiply-accumulate operation.

22. A method of implementing a multiply instruction in a processor, the method comprising:
   executing a first instruction to retrieve an accumulator result from a result register of an arithmetic unit in the processor;
   executing a multiply instruction to supply a first operand and a second operand to the arithmetic unit, the arithmetic unit configured to generate a multiplication result;
   transferring the multiplication result to a destination register of the processor; and
   executing a second instruction to load an accumulator value into the arithmetic unit.

* * * * *